(12) United States Patent
Hall et al.

(10) Patent No.: US 10,604,390 B1
(45) Date of Patent: Mar. 31, 2020

(54) PULLEY WITH LINE GUIDES

(71) Applicant: Hall Labs LLC, Provo, UT (US)

(72) Inventors: David R. Hall, Provo, UT (US); Casey Webb, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 29 days.

(21) Appl. No.: 16/159,883

(22) Filed: Oct. 15, 2018

(51) Int. Cl.
*B66D 3/04* (2006.01)
*B21D 53/26* (2006.01)
*B21D 35/00* (2006.01)
*F16H 55/44* (2006.01)
*F16H 55/48* (2006.01)
*F16H 55/36* (2006.01)

(52) U.S. Cl.
CPC ............ *B66D 3/04* (2013.01); *B21D 35/00* (2013.01); *B21D 53/261* (2013.01); *F16H 55/44* (2013.01); *F16H 55/48* (2013.01); *B66D 2700/026* (2013.01); *F16H 2055/363* (2013.01)

(58) Field of Classification Search
CPC ...... B66D 3/04; B66D 3/26; B66D 2700/026; B21D 35/00; B21D 53/261; F16H 55/44; F16H 55/48; F16H 2055/363
See application file for complete search history.

(56) References Cited

U.S. PATENT DOCUMENTS

| | | | | |
|---|---|---|---|---|
| 1,393,723 A * | 10/1921 | Schermuly | ............... | B66D 3/04 254/409 |
| 1,501,290 A * | 7/1924 | Olinger | .................... | B66D 3/04 254/409 |
| 2,060,174 A * | 11/1936 | Campbell | .......... | A61B 5/04325 254/405 |
| 4,697,790 A * | 10/1987 | Yang | ......................... | B66C 1/36 116/212 |
| 6,179,270 B1 * | 1/2001 | Higdon | .................... | B66D 3/16 254/358 |
| 2010/0032632 A1 * | 2/2010 | Maire | ...................... | B66D 3/06 254/399 |
| 2014/0008593 A1 * | 1/2014 | Kingery | .................. | B66D 3/02 254/376 |
| 2018/0093871 A1 * | 4/2018 | Nipper | ..................... | B66D 3/04 |

* cited by examiner

*Primary Examiner* — Michael E Gallion (57) ABSTRACT

A pulley is disclosed. The disclosure provides a pulley. The pulley is made up of a frame and a wheel. The frame includes a first and second plate spaced apart from each other. The wheel is rotatably connected between the first and second plate. The first and second plate each include an extended portion extending in a common direction beyond the radius of the wheel. The extended portion of the first and second plate each include a ramp for guiding a line onto the wheel. Also disclosed is a method for making the pulley.

20 Claims, 6 Drawing Sheets

PULLEY WITH LINE GUIDES

TECHNICAL FIELD

This disclosure relates to lifting and pulling devices. More specifically this disclosure relates to pulleys.

BACKGROUND

The pulley is well known. Pulleys have been a part of enabling the lifting of loads. By using a fixed pulley, the direction of force is changed. Changing the direction of the force allows a load to be lifted without pulling from above the load. Using a movable pulley enables less force to be exerted to lift a load, than lifting that same load without the moveable pulley. While the pulley has been around for hundreds of years, advances in technology have led to improvements in the construction of the pulley itself as well as in the ropes or lines with which pulleys are used.

Early models of pulleys used wood for the wheels and frames, while the rope was typically constructed of natural fibers such as hemp. These materials are adequate for certain applications. However, modern advances allow smaller, lighter, and stronger pulleys to be constructed. Not only can the frames and wheels be made smaller, lighter, and stronger but the line which works with pulley can also be made smaller, lighter, and stronger.

SUMMARY

In a first aspect, the disclosure provides a pulley. The pulley includes a frame and a wheel. The frame includes a first and second plate spaced apart from each other. The wheel is rotatably connected between the first and second plate. The first and second plate each have an extended portion extending in a common direction beyond the radius of the wheel. The extended portion of the first and second plate each include a ramp for guiding a line onto the wheel.

In a second aspect, the disclosure provides a method for making a pulley. The pulley is made by: first, providing a sheet of material to form a frame. The frame includes a first and second side plate. There are extended portions on both the first and second side plate. A bridging member is included between the first and second plate. The sheet of material is then bent. Ramps are formed into the extended portions of the first and second side plate. A rotatable wheel is attached between the first and second plate.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "radius" is meant to refer to the radius of a circle. The measure of a straight line from the center of a circle to its circumference. The radius relates specifically to a wheel which is part of a pulley. The radius of the wheel is the measurement of the straight line drawn from the center of the wheel to the outer edge of the wheel.

As used herein, "ramp" is meant to refer to an inclined plane or slope. The ramp is formed in the material of the side plate of the pulley. It is for moving or directing the line from the side plate onto the wheel.

As used herein, "plate" is meant to refer to the piece of material that makes up a single side of a pulley.

As used herein, "bridging member" is meant to refer to the material connecting the two side plates.

As used herein, "plastic" is meant to refer to materials consisting of a wide range of synthetic or semi-synthetic organic compounds that are malleable and can be molded into solid objects. Plastics include but are not limited to; polyamides, polycarbonate, polyethylene, polypropylene, polyvinyl chloride (PVC), Acrylonitrile butadiene styrene (ABS), fiberglass reinforced nylon (FRN), polyetherimide (PEI), and polylactic acid (PLA). Plastics also include bioplastics and thermoplastics.

Advances in materials and manufacturing have led to improvements in the construction of pulleys and the lines used with pulleys. In general, these advances have improved the pulley. Pulleys are generally smaller, lighter, and stronger. These attributes of smaller, lighter, and stronger also apply to the lines used with pulleys. Thinner and stronger lines are, in general, an improvement to the use of a pulley. However, a detrimental effect of a thinner line is, as the line thins, the likelihood of the line catching between the wheel and the side plate increases. To keep a line from being caught between the wheel and side plate, ramps are formed on the side plates. These ramps direct the line away from the side plates and onto the wheel.

Figure 1:
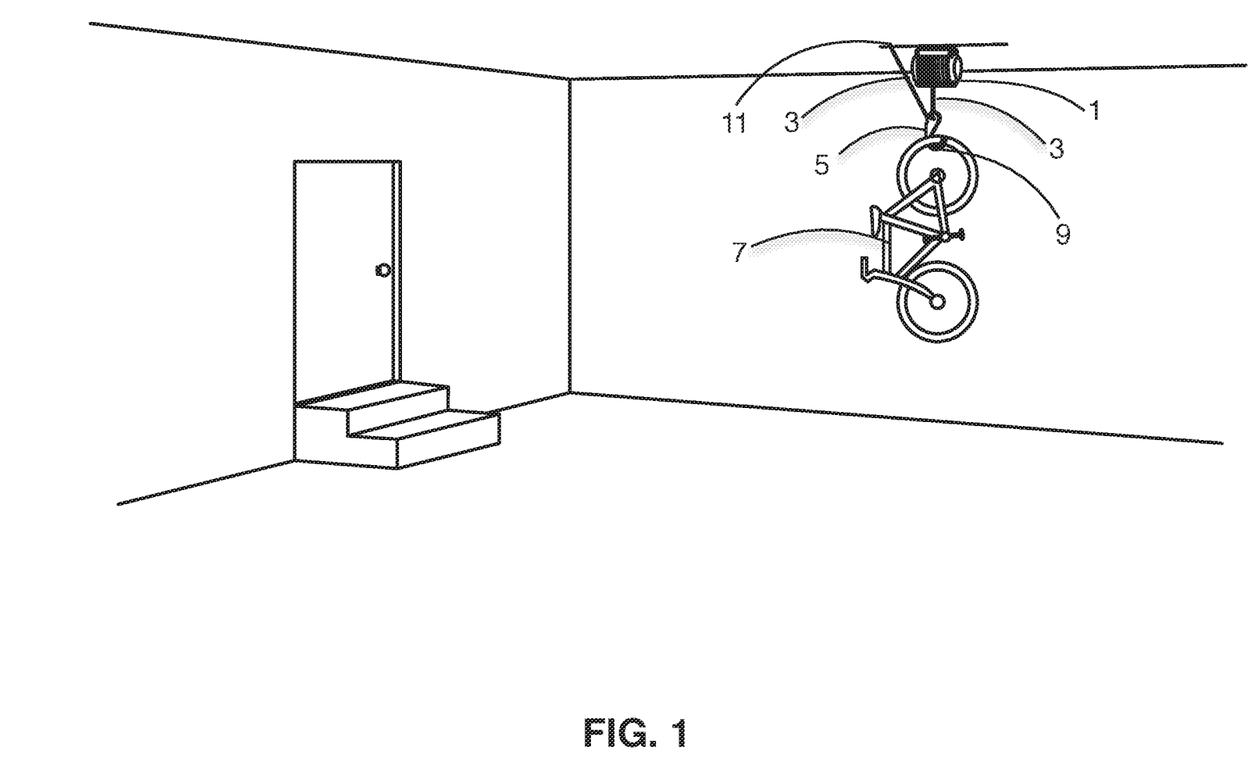
FIG. 1 is a view of the pulley attached to a ceiling mounted lifting device and lifting a bicycle.

Now referring to FIG. 1, which shows the pulley with guides in use. FIG. 1 shows the pulley attached to a lifting device, such as that described in U.S. Pat. No. 9,975,745 or 9,988,251. FIG. 1 has a bike to illustrate one embodiment of the pulley in use. The pulley 5 is formed with a hook 9. The hook 9 is used to attach to a variety of objects such as a bicycle 7. In the present embodiment, the pulley and guides are used in conjunction with a lifting device 1. The lifting device has a line 3 that runs through the pulley and attaches the end of the line to an overhead attachment system such as that described in U.S. Pat. No. 9,939,105.

Figure 2:
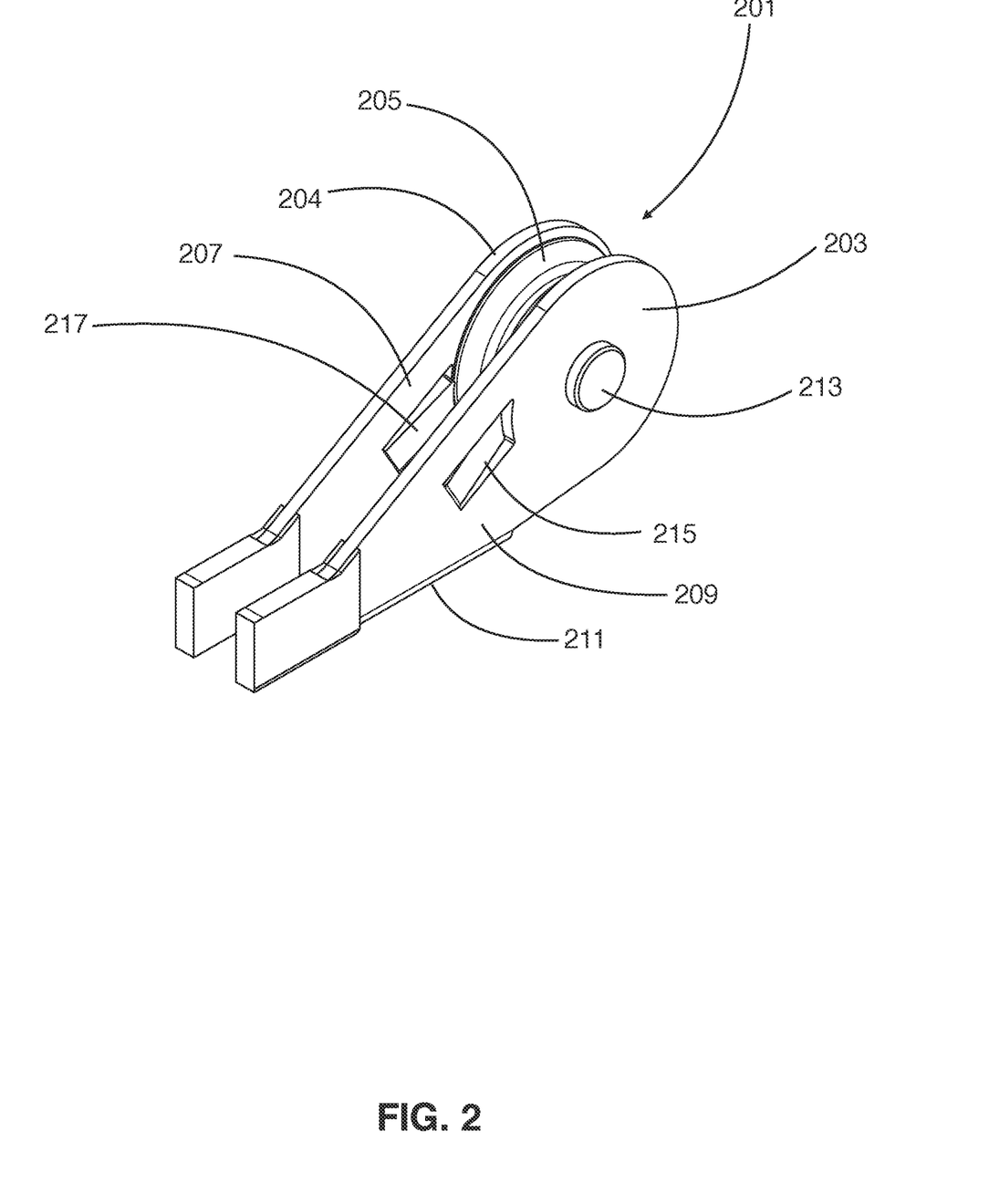
FIG. 2 is a perspective view of the pulley.

Referring to FIG. 2, the pulley with guides 201 is shown. The pulley has a frame formed by side plates 203 and 204, along with bridging member 211. Wheel 205 is located between the plates. Wheel 205 rotates on an axle 213. A line (not shown) rides on wheel 205. The side plates 203 and 204 have extended portions 207 and 209. These extended portions extend beyond the radius of wheel 205 in a common direction. These extended portions include ramps 215 and 217. The ramps 215 and 217 direct the line onto the wheel. The ramps 215 and 217 also keep the line from catching between the wheel 205 and either side plate 203 or 204. The angle created by the ramps is between 5 and 85 degrees. More preferably the angle formed by the ramp is between 8 and 60 degrees. Most preferably the angle formed by the ramp is between 10 and 30 degrees. Ramps 215 and 217 are formed into the extended portions 207 and 209 of the side plates 203 and 204 to keep the line from catching between the wheel 205 and the side plates 203 and 204.

The ramps are effective in keeping the line on the wheel in many situations. One example occurs during the initial setup of the pulley in conjunction with the lifting device. During setup, the free end of the line is attached to a carabiner. The line is threaded through the pulley. As the line is being attached to the overhead mounting system the pulley is free to move around. In situations such as this, the line is more likely to get caught between the wheel and one of the side plates. Ramps formed into the side plates direct the line away from the side plates and the edge of the wheel. Therefore, the line is kept from catching between one of the side plates and the wheel.

In the preferred embodiment, a metal sheet is used in forming the frame of the pulley. The process of forming the frame from a sheet of material will be discussed later.

The wheel 205 is made of plastic. In other embodiments, the wheel is formed from other materials such as aluminum, anodized aluminum, aluminum alloys, titanium, steel and any number of other materials. Some wheels are constructed with bearings. Some wheels are constructed without bearings. A skilled practitioner will be able to choose the correct wheel construction for the conditions.

As an alternative to an axle, in certain embodiments, the wheel includes center spindles on each side that journal within holes in the first and second side plate. By having a wheel with center spindles, the number of parts in the pulley is reduced. A wheel with center spindles is capable of holding itself in place and will not require a pin or other fastener. However, using pins or other fasteners to secure the wheel with center spindles to the frame will decrease the possibility of the wheel with center spindles coming free from the frame.

The axle 213 is generally made of steel. In some embodiments, the axle is made of another material such as aluminum, titanium, or plastic. The axle has a head, a shaft, and a hole through the shaft on the end opposite the head. A pin, such as a clevis pin, is inserted in the hole to keep the axle secured to the frame.

Figure 3:
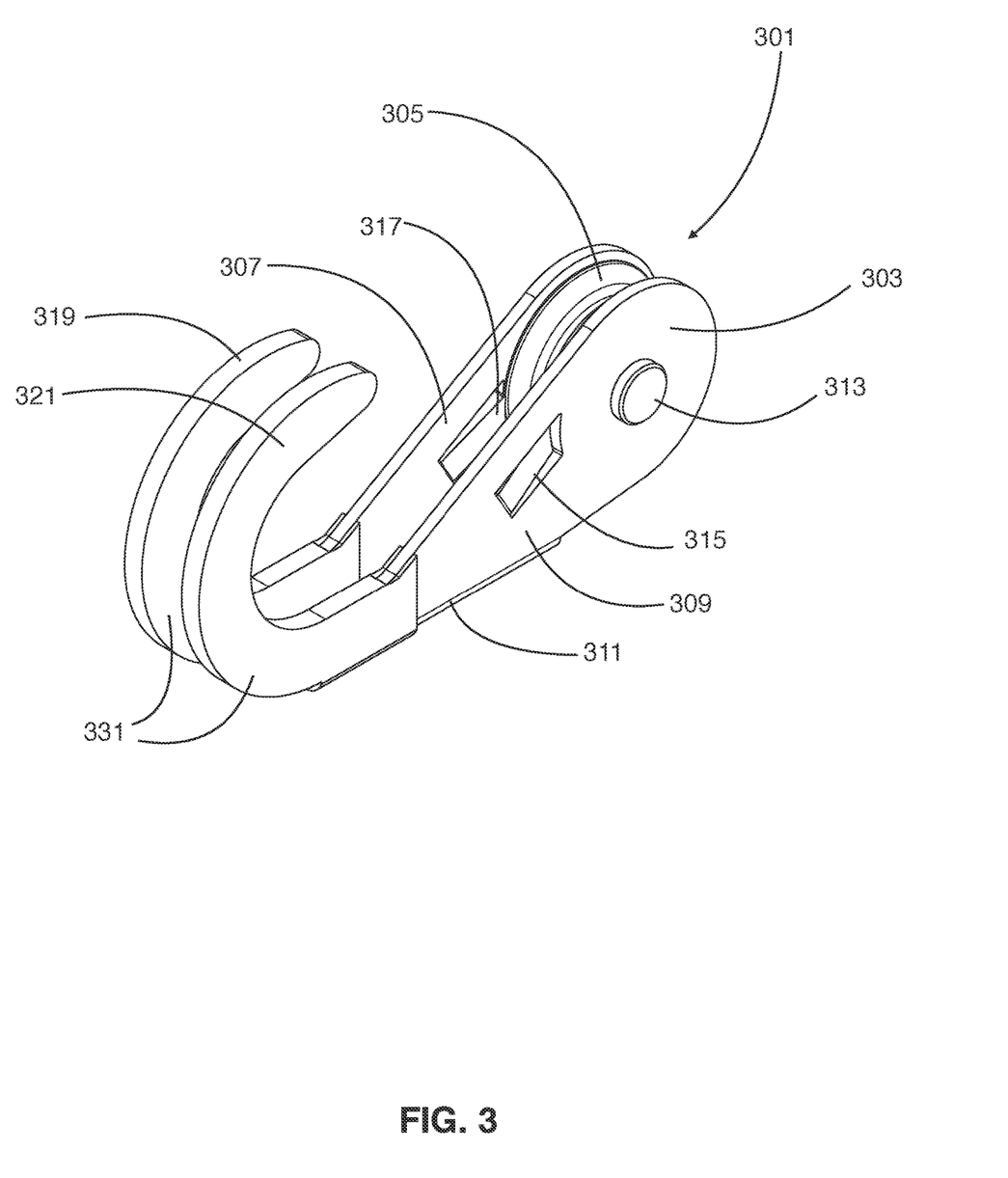
FIG. 3 is a perspective view of the pulley with hooks.

Hooks integrated into the extended portions of the pulley are shown in FIG. 3. The pulley has a frame formed by side plates 303 and 304, along with bridging member 311. A wheel 305 is located between the plates. The wheel 305 rotates on an axle 313. A line (not shown) rides on the wheel 305. The side plates 303 and 304 have extended portions 307 and 309. These extended portions extend beyond the radius of the wheel 305. These extended portions include ramps 315 and 317. The ramps 315 and 317 direct the line onto the wheel. The ramps 315 and 317 keep the line from catching between the wheel 305 and either side plate 303 or 304. The side plates are joined together and kept at a fixed distance apart by a bridging member 311. In the preferred embodiment, the side plates 303 and 304 of the pulley frame extend into hooks 319 and 321. The two hooks are parallel and function as a single hook. The hook ends are coated in a slip-resistant coating 331. This coating helps to reduce the sliding of objects attached to hooks 319 and 321. One use of the pulley hook is to lift objects like bicycles to store them up and out of the way.

As noted, the preferred embodiment has two parallel hooks that function as a single hook. However, in other embodiments, the pully has more hooks or hooks that are oriented in different ways. For example, instead of the hooks being an extension of the side plates and parallel to each other the hooks are oriented perpendicular to the side plates. This enables the hooks to act independently. In other words, the hooks are oriented so that an object is attached to each of the hooks individually. Another embodiment would be to add another set of hooks that extend in the opposite direction of the depicted hooks. There are many orientations and configurations for the hooks which are employed depending on the use the hooks and pulley will be put to.

The frame, including bridging member 311, is preferably formed from a single piece of material. However, there are embodiments in which the side plates 303 and 304 and bridging member 311 are not formed from a single piece of material. These pieces would be formed individually. The side plates 303 and 304 and bridging member 311 would be attached together by welds, rivets, bolts, or other methods.

Figure 4:
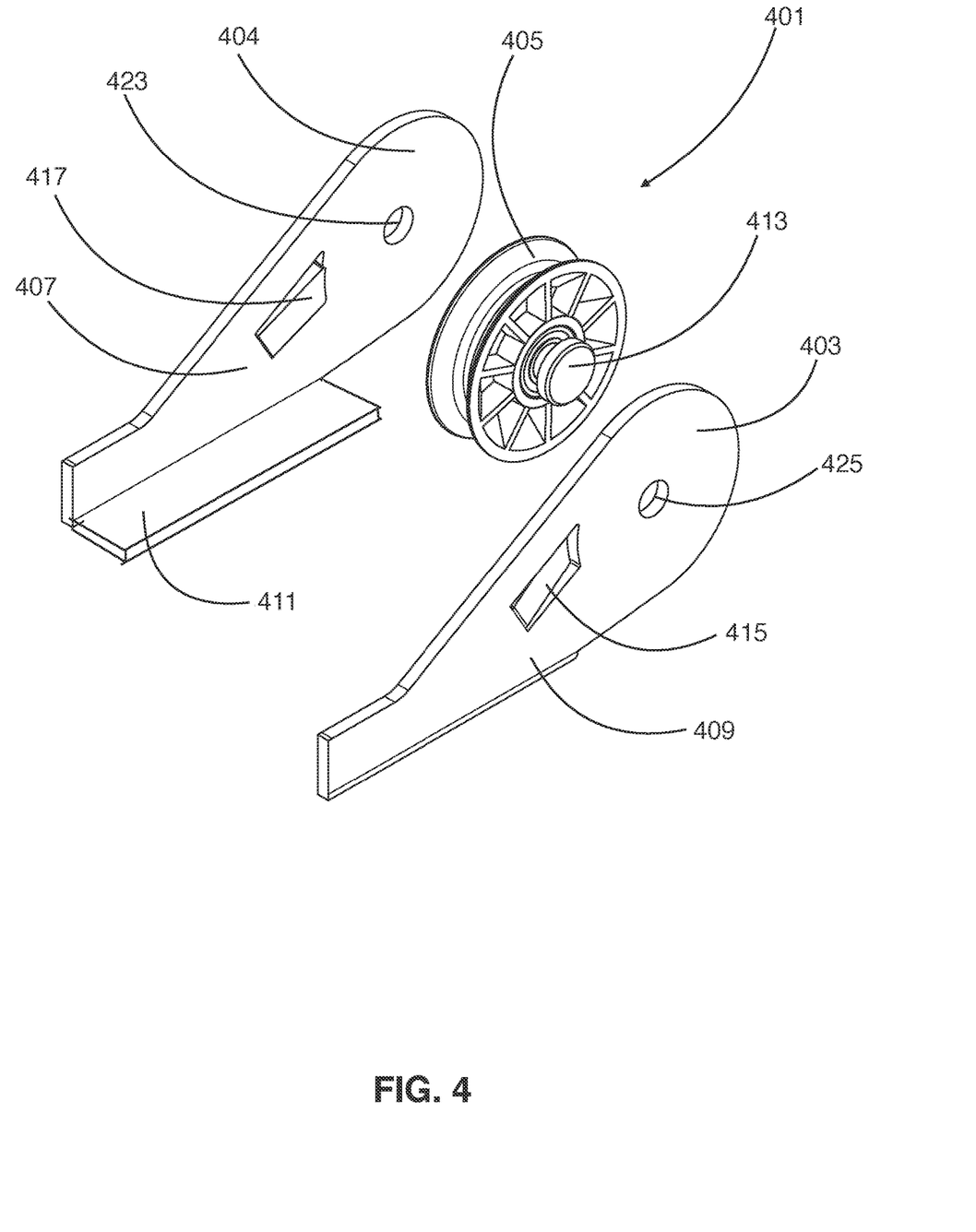
FIG. 4 is an exploded view of the pulley.

Referring to the exploded view in FIG. 4, the pulley with guides 401 is shown. The pulley has a frame formed by side plates 403 and 404, along with bridging member 411. A wheel 405 is located between the plates. The wheel 405 rotates on an axle 413. A line (not shown) rides on the wheel 405. The side plates 403 and 404 have extended portions 407 and 409. These extended portions extend beyond the radius of the wheel 405. These extended portions include ramps 415 and 417. The ramps 415 and 417 direct the line onto the wheel. The ramps 415 and 417 also keep the line from catching between the wheel 405 and either side plate 403 and 404. The ramp 415 is seen on the inner surface of the pulley frame, and it protrudes into the interior and guides the line onto the wheel. As can be seen with ramp 415 the outer surface of the pulley frame has an indentation from the plane of the outer surface. The ramps use the material in the extended portion of the side plates in their formation. No extra material is used to form the ramps, in the preferred embodiment, the ramps are formed by stamping the material with a die which protrudes the ramps above the inner surface of the pulley frame and leaves an indentation on the outer surface of the pulley frame.

By forming ramps 415 and 417 into the extended portions 407 and 409 of the side plates 403 and 404 the line is kept from catching between the wheel 405 and the side plates 403 and 404. The side plates are joined together and kept at a fixed distance apart by a bridging member 411. In this exploded view the bridging member 411 is not connected to the side plate 403 (this is merely for the purpose of representation). The side plates 403 and 404 have holes 423 and 425 for the axle 413 to pass through.

Figure 5:
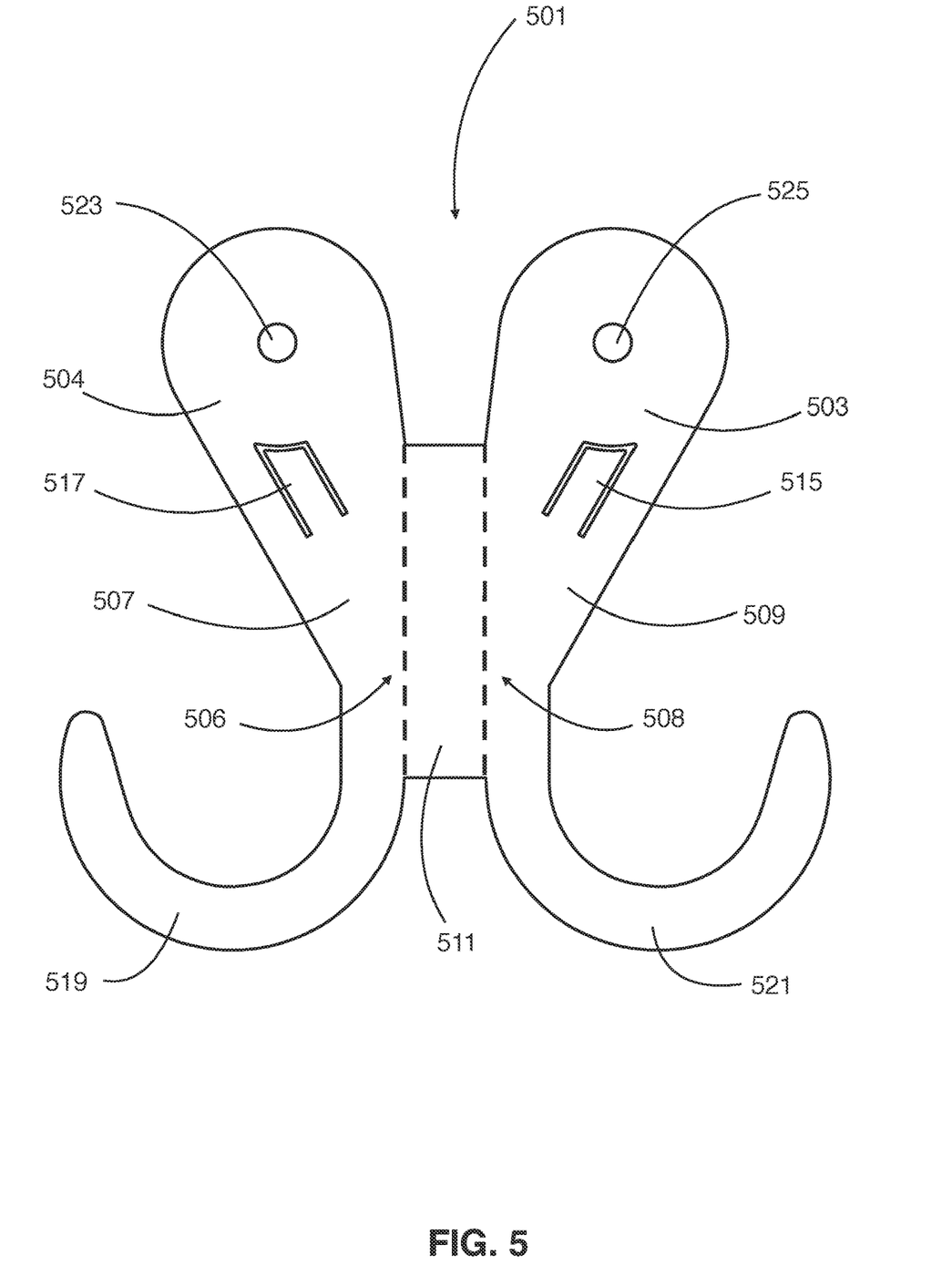
FIG. 5 is a view of the sheet of material before being bent to form the pulley.

The pulley frame is formed by stamping or cutting the frame from a sheet of material. As can be seen in FIG. 5, the pulley frame 501 is shown from a view as it would appear after being formed but before bending the frame to its final shape. The stamped pulley frame includes two side plates 503 and 503 and bridging portion 511. The side plates contain extended regions 507 and 509. Within the extended portion 507 and 509 of the side plates, ramps 515 and 517 have been formed. It is of note that the ramps are preferably formed such that the ramps are stamped into the material. The ramps are not cut and bent, they are pressed such that the side that will end up as the interior of the pulley frame has the ramps above the plane of the surface of the frame and the side that will become the outside of the pulley frame has a divot below the plane of the outside surface. This is shown in FIG. 4. The openings for the axle to pass through 523 and 525 have been formed at this time as well. The bridging member 511 is shown. In this embodiment, the hooks 519 and 521 are shown. In other embodiments, the hooks will be absent, and the pulley will have side plates 503 and 504 along with extended portions 507 and 509.

In the preferred embodiment, the pulley frame is formed from metal. More preferably the metal is steel that has a protective coating to cover the steel. In other embodiments, the metal will be any of a number of metals or metal alloys such as aluminum, anodized aluminum, titanium, anodized titanium, or any alloys of aluminum and titanium. A die is created that cuts the pulley frame from metal sheets. The die is generally the shape of the pulley frame with the openings 523 and 525 for the axle to pass through. The ramps 515 and 517 are stamped into the extended portions 507 and 509 of side plates 503 and 504. The material is bent along lines 506 and 508 so that the side plates become parallel to each other and perpendicular to the bridging member. The frame is bent along lines 506 and 508 such that the ramps 515 and 517 end up toward the interior of the frame. Alternatively, in another embodiment, the pulley frame is made by casting metal or some other material in a mold.

One of the reasons a metal sheet is preferred in forming the frame is that it can be formed into specific shapes. Additionally, the ductility of metals makes it possible to stamp the ramps into the extended portions of the side plates. The frame can then be bent into shape. Metals allow the side plates to be bent into a position perpendicular to the bridging member. In the more preferred embodiment, the frame is formed from steel. In many embodiments, the steel frame is coated in a protective coating. Many protective coatings are known and used. A typical protective coating is a powder coat. There are various other protective coatings that could be used in other embodiments, some of these coatings include electroplating, galvanization, and coatings that are painted on. These protective coatings are beneficial to protect the steel from rusting. In other embodiments, the metal used is aluminum, anodized aluminum, or an aluminum alloy. Other metals such as titanium, anodized titanium, or titanium alloys are used in certain embodiments.

In other embodiments, the frame is made from a plastic. In some of these embodiments, the frame is cut from a sheet and bent in much the same way a metal frame is formed. If using a plastic sheet, there will typically be an additional step of heating the plastic while the frame is being bent to shape. In other embodiments, the plastic frame is injection molded such that the plastic is forced into a mold and then formed. In embodiments where injection molding is used the molds are created so that the frame is formed with the ramps in the extended portion of the side plates.

Figure 6:
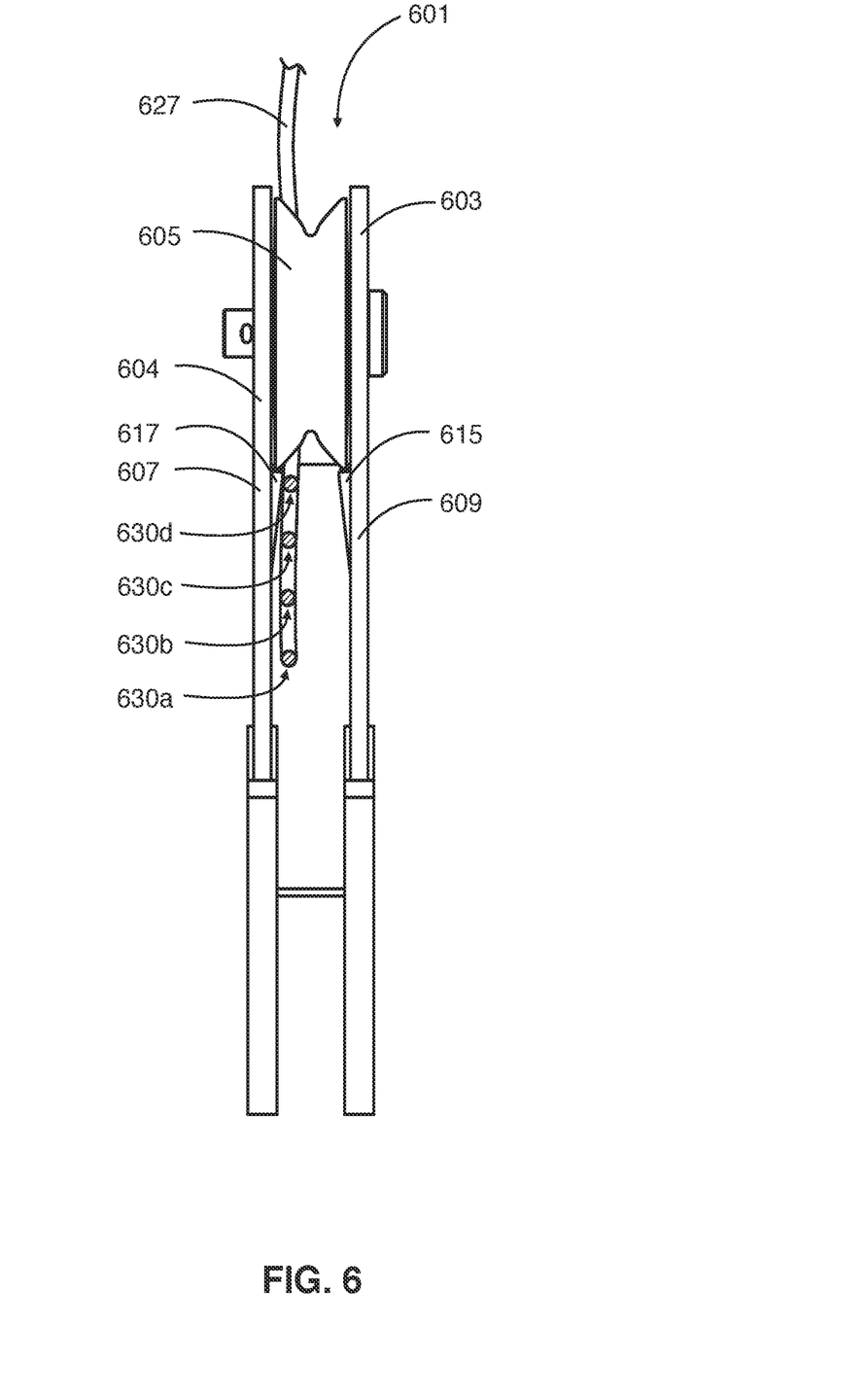
FIG. 6 is a side view showing the interior of the frame of the pulley with guides for the line.

FIG. 6 is a view looking into the interior of the pulley 601. An example of the ramps directing the line onto the wheel will be helpful in understanding their function. The pulley has a frame with side plates 603 and 604. The side plates include extended portions 607 and 609. The frame includes ramps 615 and 617 on extended portions 607 and 609. As the pulley is being used with the line 627 to lift loads, the line usually stays seated on the wheel 605. Occasionally, slack occurs in line 627. It is when a line is pulled taut after being slack that there is a possibility of that line catching between one of the side plates and the wheel. An example will illustrate how the ramps prevent this from happening. In this example, line 627 is depicted in several positions. For this example, line 627 is shown in cross-section to illustrate the movement of line 627. Slack in line 627 causes line 627 to extend to position 630*a*. As line 627 is being pulled taut it slides along extended portion 607 of side plate 604 to position 630*b*. At position 630*c* line 627 encounters ramp 617 which pushes line 627 away from side plate 604 and the edge of wheel 605. Line 627 continues to slide along ramp 617 to position 630*d*. As line 627 passes position 630*d* it moves away from side plate 604 and the edge of wheel 605. Ramp 617 moved line 627 away from side plate 604 and kept line 627 from getting caught between wheel 605 and side plate 604.

A description of what occurs when a pulley without guide ramps is used will be illustrative in understanding the importance of the ramps. As a pulley is being used with a line to lift loads, the line usually stays seated on the wheel. Occasionally, slack occurs in the line. Then when the line is pulled taut after being slack there is a possibility of catching the line between one of the side plates and the wheel. Slack in the line causes the line to extend off the wheel. As the line is being pulled taut it slides along the extended portion of one side plate. The line continues to slide along the side plate and toward the edge of the wheel. The line slides along the side plate until it encounters the edge of the wheel. The line is now caught between the wheel and one side plate.

All patents referred to herein are incorporated herein by reference. The invention has been described with reference to various specific and preferred embodiments and techniques. Nevertheless, it is understood that many variations and modifications may be made while remaining within the spirit and scope of the invention.

What is claimed is:
1. A pulley comprising;
 a frame comprising a first and second plate spaced apart from each other,
 a wheel rotatably connected between the first and second plate, and wherein the first and second plate each comprise an extended portion extending in a common direction beyond the radius of the wheel; and wherein the extended portion of the first and second plate each comprise a ramp for guiding a line onto the wheel.

2. The pulley of claim 1, wherein the sides are connected by a bridging member.

3. The pulley of claim 2, wherein the sides and bridging member are formed from a single piece of material.

4. The pulley of claim 3, wherein the material is metal and wherein the ramps are stamped into the extended portions.

5. The pulley of claim 4, wherein the first and second plate and the bridging member are formed by bending a single sheet of metal.

6. The pulley of claim 5, wherein the first and second side plate each form a hook.

7. The pulley of claim 6, further comprising a protective coating, covering at least a portion of the frame.

8. The pulley of claim 7, wherein the hooks are covered with a slip-resistant coating.

9. The pulley of claim 3, wherein the material is plastic.

10. The pulley of claim 1, wherein the wheel includes center spindles on each side that journal within holes in the first and second side plate.

11. The pulley of claim 1, further comprising an axle upon which the wheel rotates, which axle is attached to the first and second side plate.

12. A method of making a pulley comprising:
providing a sheet of material;
forming a frame comprising; a first and second side plate, with extended portions on both the first and second side plate, and a bridging member between the first and second plate by bending the sheet of material;
forming ramps into the extended portions of the first and second side plate; and
attaching a rotatable wheel between the first and second plate.

13. The method of claim 12, wherein the ramps are stamped into the extended portions.

14. The method of claim 13, wherein the sheet of material is metal.

15. The method of claim 14, wherein at least a portion of the frame is covered by a protective coating.

16. The method of claim 12, wherein the material is plastic.

17. The method of claim 14, wherein the sheet is cut into the appropriate shape before the bending step.

18. The method of claim 17, wherein the appropriate shape includes a first hook, which after the bending step extends from the first side plate.

19. The method of claim 18, wherein the appropriate shape includes a second hook, which after the bending step extends from the second side plate and mirrors the first hook.

20. The method of claim 19, wherein the hooks are covered in a slip-resistant coating.

* * * * *